(12) United States Patent
Lee

(10) Patent No.: US 6,874,964 B1
(45) Date of Patent: Apr. 5, 2005

(54) DETACHABLE PRINTING MODULE FOR BARCODE PRINTER

(75) Inventor: Chen Cheng Lee, Shindian (TW)

(73) Assignee: Taiwan Semiconductor Co., Ltd., Taipei (TW)

( * ) Notice: Subject to any disclaimer, the term of this patent is extended or adjusted under 35 U.S.C. 154(b) by 0 days.

(21) Appl. No.: 10/668,797

(22) Filed: Sep. 22, 2003

(51) Int. Cl.[7] .......................... B41J 29/13; G03G 21/16
(52) U.S. Cl. ...................... 400/692; 400/693; 400/103; 347/107; 347/108
(58) Field of Search ................................ 400/691, 692, 400/693, 701, 103, 120.01; 347/2, 107, 108, 170, 222, 263; 399/110

(56) References Cited

U.S. PATENT DOCUMENTS 5,092,688 A * 3/1992 Haennelt et al. ............ 400/103
6,155,731 A * 12/2000 Bertalan et al. ............ 400/621

* cited by examiner

Primary Examiner—Leslie J. Evanisko
(74) Attorney, Agent, or Firm—Pro-Techtor International Services

(57) ABSTRACT

A printing module mounted inside the top cover of a barcode printer and adapted to print a barcode on a sheet member is constructed to include an output unit having a relatively higher first mounting face and a relatively lower second mounting face and a USB connector, a bottom panel affixed to the second mounting face of the output unit and hooked on the bottom side of the output unit, a locating plate affixed to the first mounting face of the output unit, a holder frame coupled to the locating plate and adapted to detachably secure the printing module to the inside of the top cover of the barcode printer by a hook joint.

16 Claims, 5 Drawing Sheets

DETACHABLE PRINTING MODULE FOR BARCODE PRINTER

BACKGROUND OF THE INVENTION

1. Field of the Invention

The present invention relates to barcode printers and, more particularly, to a detachable printing module for use in a barcode printer.

2. Description of the Related Art

Most consumer goods have a scan area printed with a barcode. When scanned with a barcode reader, the commodity number and price are known. A barcode may be directly printed on the packing material of the commodity. Alternatively, the barcode can be printed on a label and then adhered to the commodity. By means of reading the barcode through a barcode reader, the commodity number and price of the commodity are immediately known. A barcode printer for use to print a barcode on a sheet member, for example, a sticker, generally comprises a sheet-transfer unit adapted to deliver a sheet member forwards for printing, a printing mechanism adapted to print a barcode on the moving sheet member, and a toner cartridge (or ink cartridge) adapted to supply toner (or ink) to the printing head of the printing mechanism for printing. When the printing head contaminated with toner (or ink), the printing quality becomes poor. At this time, the printing mechanism must be well cleaned. However, the complicated mounting structure of the printing mechanism does not allow the user to detach the printing mechanism conveniently for cleaning.

Therefore, it is desirable to provide a detachable printing module for a barcode printer that eliminates the aforesaid problem.

SUMMARY OF THE INVENTION

The present invention has been accomplished under the circumstances in view. It is the main object of the present invention to provide a printing module for barcode printer, which can easily and detachably installed in the barcode printer.

To achieve this and other objects of the present invention, the printing module comprises an output unit adapted to print a barcode on a sheet member, the output unit comprising a relatively higher first mounting face and a relatively lower second mounting face disposed at a top side thereof, and a connector disposed at the second mounting face; a bottom panel affixed to the second mounting face of the output unit; a locating plate affixed to the first mounting face of the output unit; a holder frame coupled to the locating plate and adapted to secure the printing module to the inside of the top cover of the barcode printer, a reinforcing plate mounted on the top side of the holder frame, and a spring member inserted through an opening at the holder frame and supported between the reinforcing plate and the locating plate to impart a forward pressure to the output unit toward the sheet member to be printed.

DETAILED DESCRIPTION OF THE PREFERRED EMBODIMENT

Figure 1:
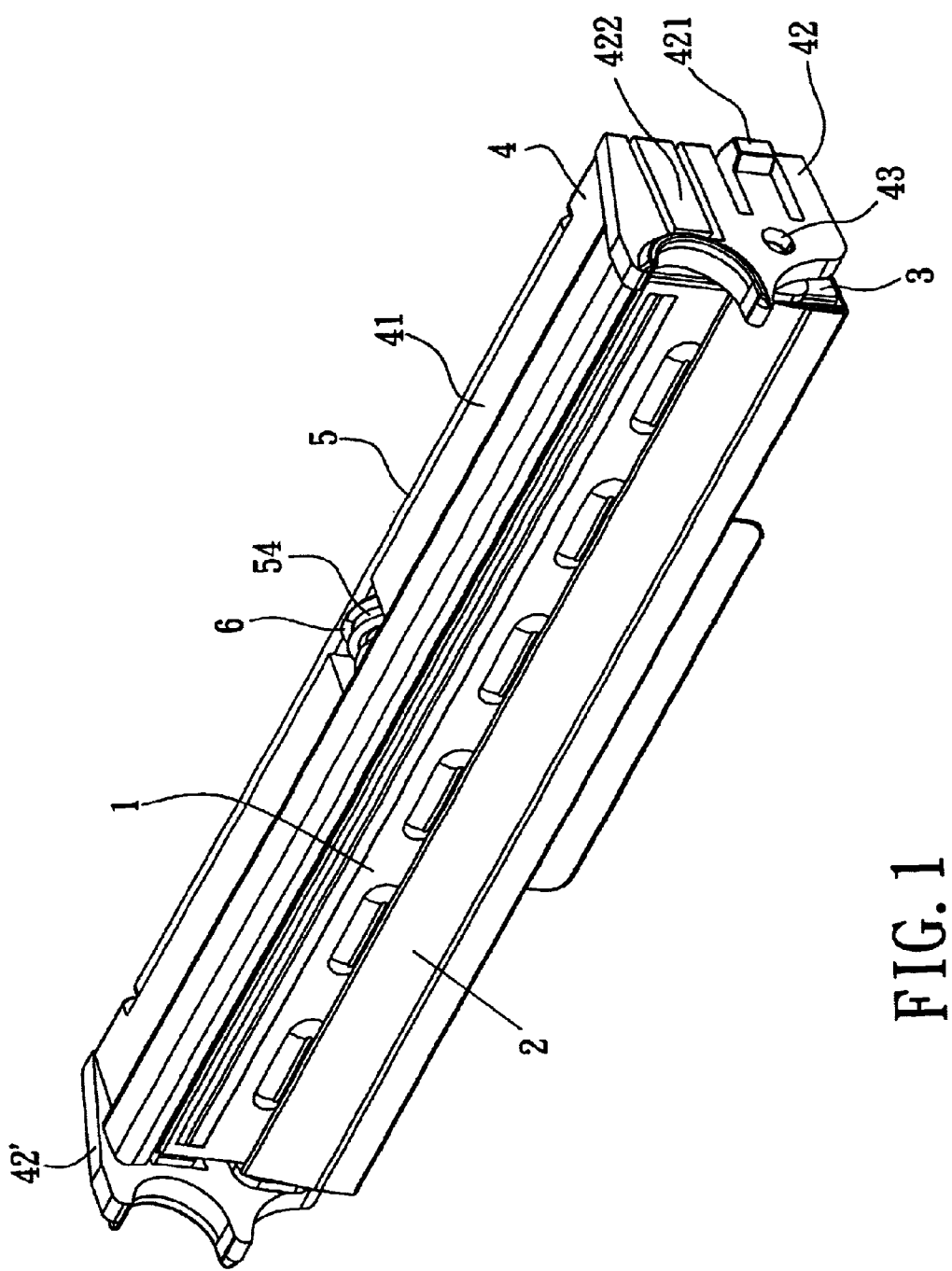
FIG. 1 is an elevational view of a printing module according to the present invention.
Figure 2:
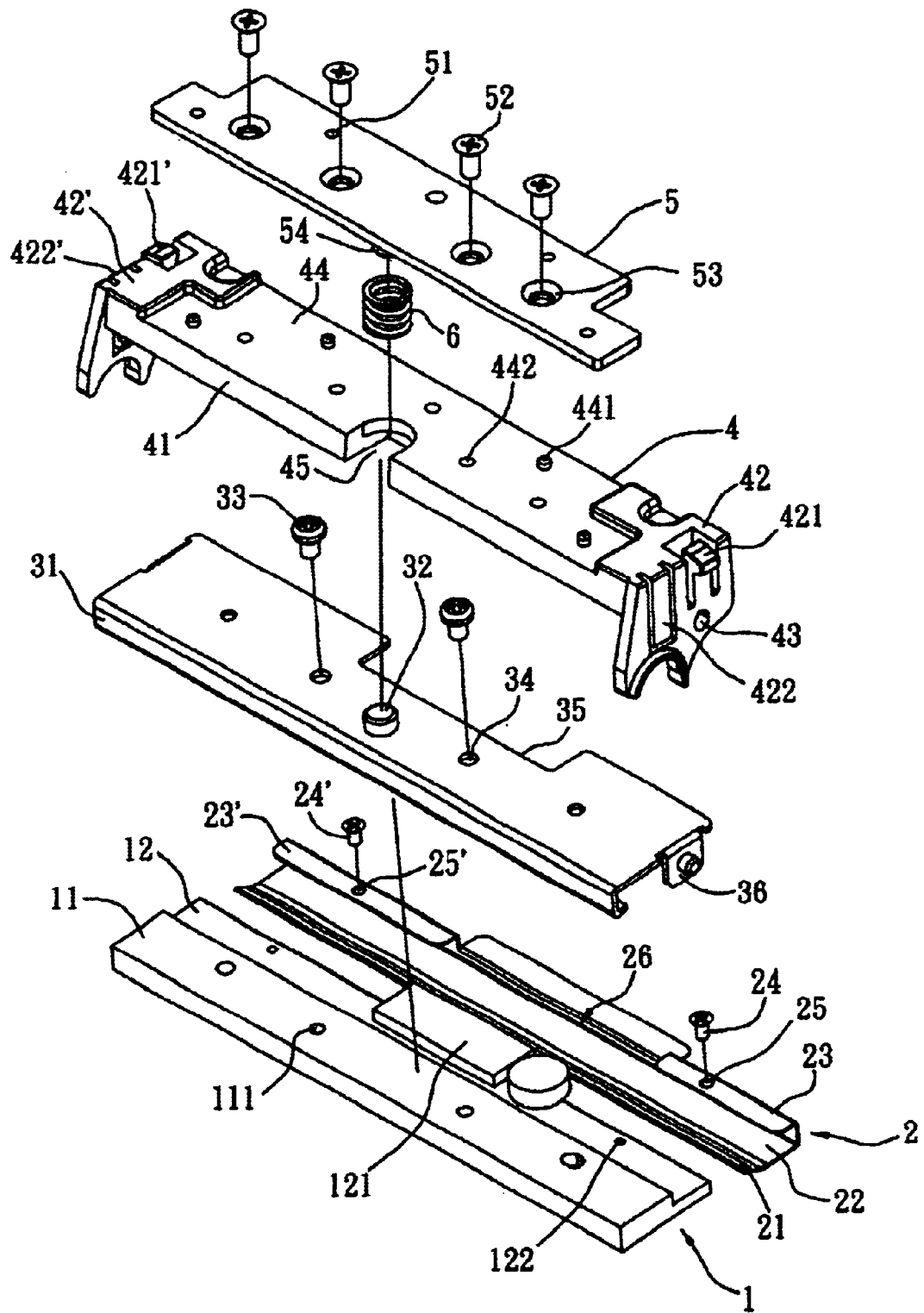
FIG. 2 is an exploded view of the printing module according to the present invention.

Referring to FIG. 1, a printing module for use in a barcode printer is shown comprising an output unit 1, a bottom panel 2 mounted on the output unit 1, a locating plate 3 mounted on the output unit 1 over the bottom panel 2, a holder frame 4 fastened to the locating plate 3, a reinforcing plate 5 connected to the holder frame 4, and a spring member 6 supported between the locating plate 3 and the reinforcing plate 5. The printing module can easily and detachably be installed in the barcode printer.

The output unit 1 is a carbon or ink type printing head (not shown), having a relatively higher first mounting face 11 and a relatively lower second mounting face 12 disposed in parallel at the top side at different elevations, a plurality of first mounting holes 111 disposed at the first mounting face 11 for the mounting of the locating plate 3, a USB connector 121 disposed at the second mounting face 12 for the connection of the USB connector inside the top cover of the barcode printer (not shown), and a plurality of second mounting holes 122 symmetrically disposed at the second mounting face 12 at two sides of the USB connector 121.

The bottom panel 2 is mounted on the second mounting face 12 of the output unit 1, having an elongated base 22, a retaining portion 21 extended along one long side of the elongated base 22 and smoothly curved in transverse direction and hooked on the bottom side of the output unit 1, two angled mounting flanges 23 23' bilaterally extended from the other long side of the elongated base 22 and respectively cover ed on the second mounting face 12 of the output unit 1 at two sides of the USB connector 121, a plurality of mounting holes 25 25' disposed at the angled mounting flanges 23 and respectively connected to the second mounting holes 122 of the output unit 1 by fastening members 24 and 24', and an opening 26 defined between the angled mounting flanges 23 for accommodating the USB connector 121 of the output unit 1.

The locating plate 3 is mounted on the first mounting face 11 of the output unit 1, having an angled side flange 31 hooked on one side of the output unit 1 over the first mounting face 11, a plurality of mounting holes 34 respectively connected to the first mounting holes 111 of the output unit 1 by fastening members 33, a top stub rod 32 disposed at the top side on the middle, an opening 35 disposed corresponding to the opening 26 of the bottom panel 2 for the passing of the USB connector 121 of the output unit 1, and two male coupling portions (for example, coupling pins) 36 disposed at two distal ends for the connection of the holder frame 4.

The holder frame 4 is connectable to the top cover of the barcode printer, comprising a flat elongated holder base 41, two extension arms 42 and 42' respectively formed integral with the two distal ends of the holder base 41, two first springy hooks 421 and 421' respectively outwardly extended from the extension arms 42 and 42' and adapted to secure the holder frame 4 to the top cover of the barcode printer, two second springy hooks 422 and 422' respectively inwardly extended from the extension arms 42 and 42' and respectively hooked on the two distal ends of the locating plate 3, two female coupling portions (for example, pin holes) 43 respectively formed in the extension arms 42 and 42' and coupled to the two male coupling portions 36 of the locating plate 3, a plurality of mounting holes 442 formed in the holder base 41 within the space 44 between the extension arms 42 and 42', a plurality of male locating means (for example, locating pins) 441 upwardly extended from the top surface of the holder base 41, and a side opening 45 formed in one long side of the holder base 41 on the middle.

The reinforcing plate 5 is set in the space 44 between the extension arms 42 and 42' of the holder frame 4, having a plurality of mounting holes (countersunk holes) 53 respectively connected to the mounting holes 442 of the holder frame 4 by fastening members 52, a plurality of female locating means (for example, pin holes) 51 respectively coupled to the male locating means (locating pins) 441 of the holder frame 4, and a bottom stub rod 54 downwardly extended from the bottom wall corresponding to the side opening 45 of the holder frame 4.

The spring member 6 can be a compression spring, spring leaf, or elastomer inserted through the side opening 45 of the holder frame 4 and connected between the bottom stub rod 54 of the reinforcing plate 5 and the top stub rod 32 of the locating plate 3. After installation of the printing module in the top cover of the barcode printer, the spring member 6 imparts a pressure to the output unit 1 in direction toward the sheet member to be printed, achieving a satisfactory printing performance.

Figure 3:
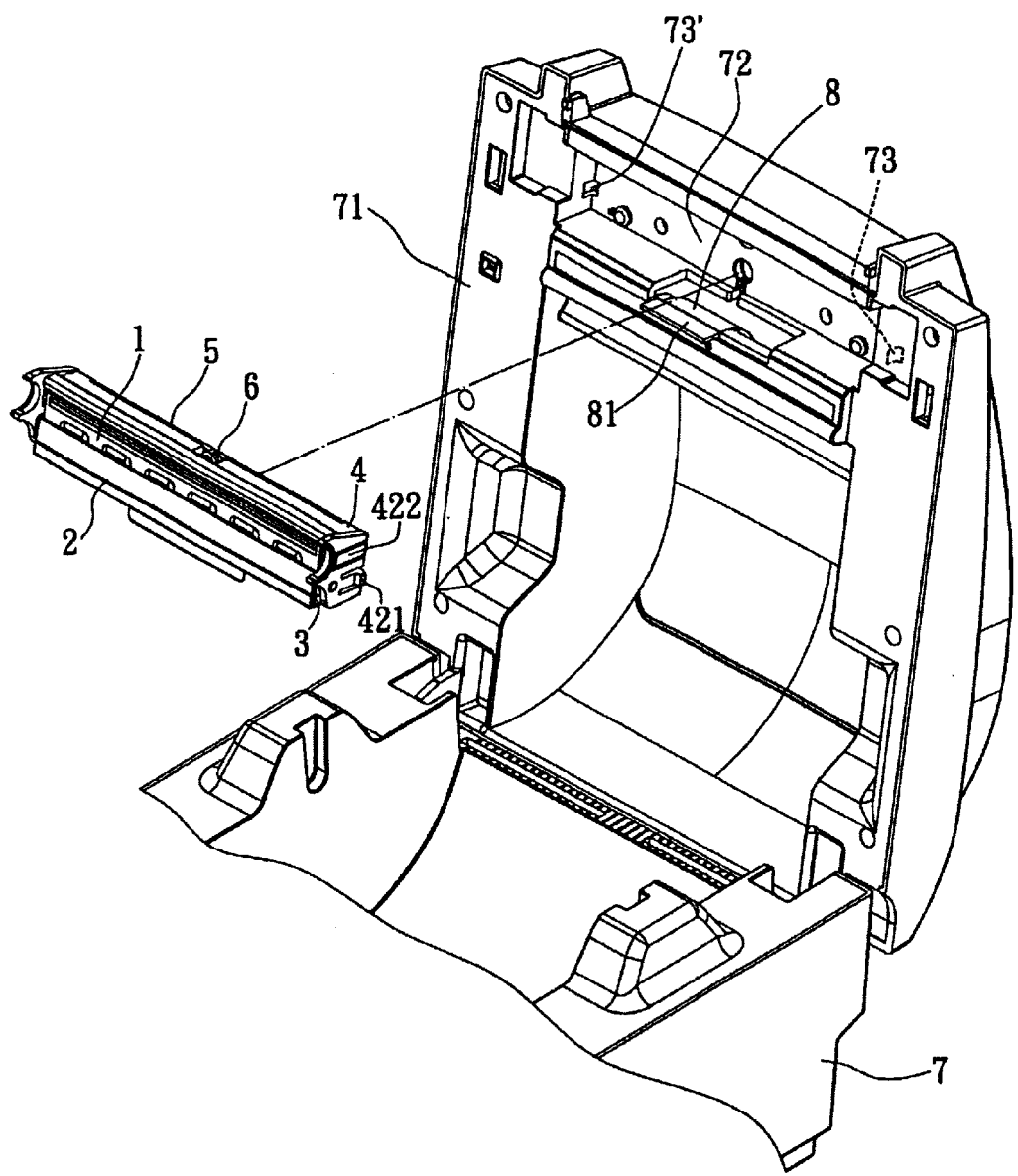
FIG. 3 is an exploded view showing the relationship between the printing module and the barcode printer according to the present invention.
Figure 4:
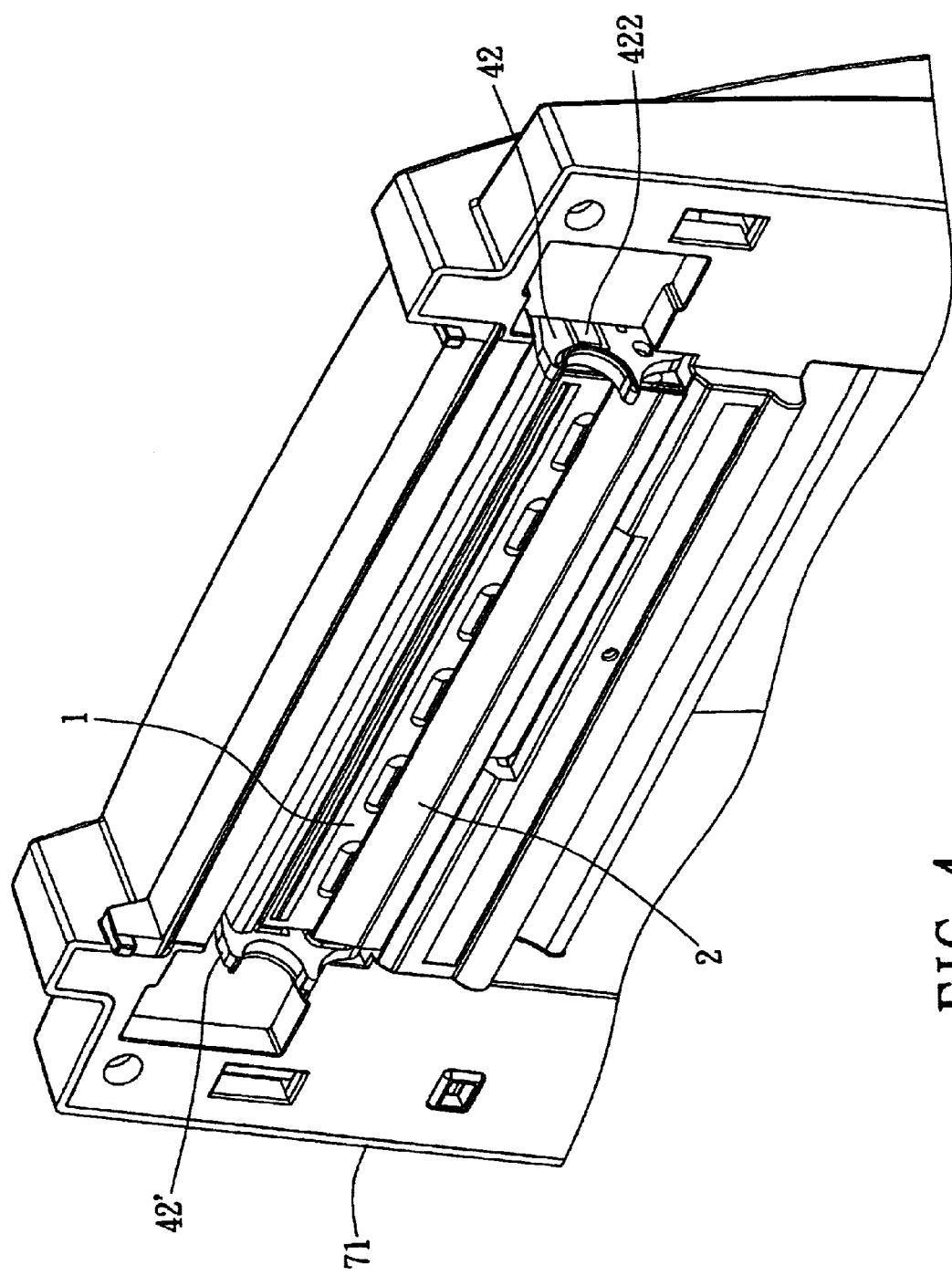
FIG. 4 illustrates the printing module installed in the barcode printer according to the present invention.

Referring to FIGS. 3 and 4, when the output unit 1, the bottom panel 2 and the locating plate 3 assembled, the holder frame 4 is fastened to the locating plate 3 and then the reinforcing plate 5 is fastened to the holder frame 4, keeping the spring member 6 supported between the reinforcing plate 5 and the locating plate 3. After assembly, the assembled printing module is put in the mounting chamber 72 inside the top cover 71, and then the USB connector 81 of the transmission line 8 inside the top cover 71 of the barcode printer 7 is connected to the USB connector 121 of the output unit 1, and then the two first springy hooks 421 and 421' of the holder frame 4 are respectively hooked in the respective hook holes 73 and 73' inside the mounting chamber 72 of the top cover 71 of the barcode printer 7 to lock the printing module to the top cover 71 of the barcode printer 7.

When wishing to examine, clean, or replace the printing module, disengage the first springy hooks 421 and 421' of the holder frame 4 from the respective hook holes 73 and 73' inside the mounting chamber 72 of the top cover 71 of the barcode printer 7, and then remove the printing module from the top cover 71 of the barcode printer 7. Alternatively, the user can disengage the second springy hooks 422 and 422' from the locating plate 3 and then remove the output unit 1 for examination, cleaning, or replacement. After examination, cleaning, or replacement, the well cleaned printing module or the new printing module is set in the top cover 71 of the barcode printer 7 again.

Figure 5:
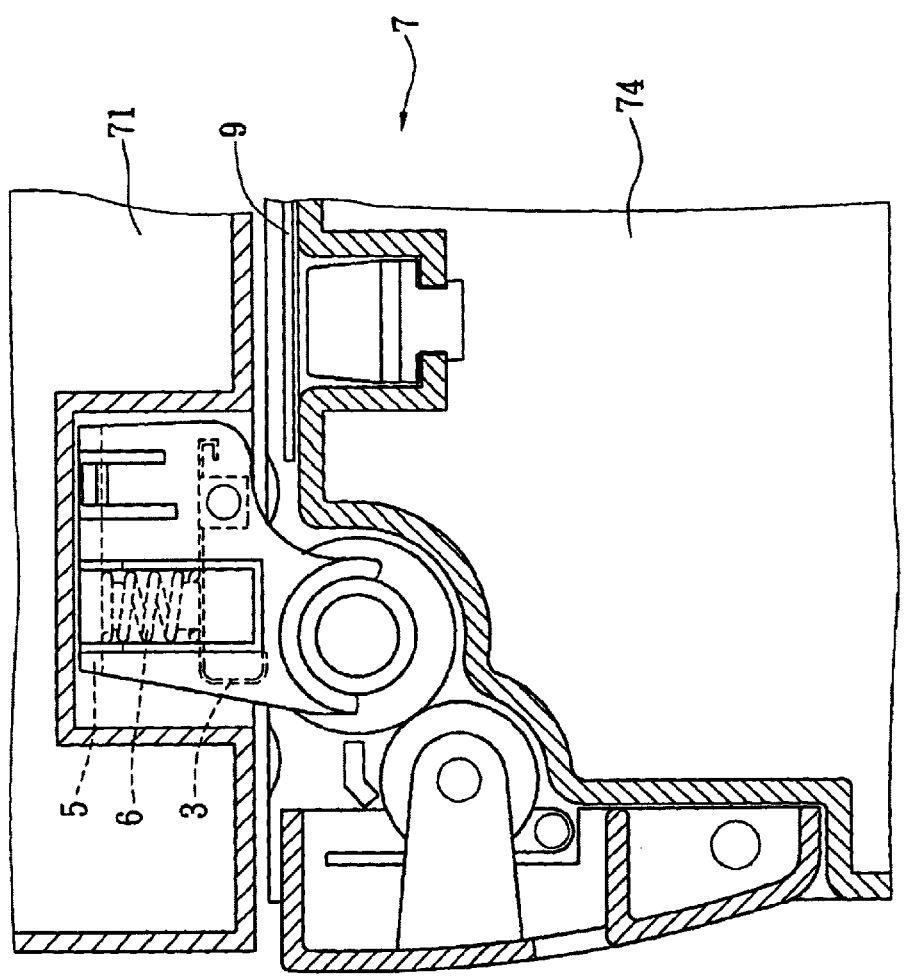
FIG. 5 is a side view in section in an enlarged scale of a part of FIG. 4, showing the operation of the printing module.

Referring to FIG. 5, after closing of the top cover 71 on the main body 74 of the barcode printer 7, the sheet-transfer mechanism inside the main body 74 is controlled to deliver a sheet member 9 over the bottom side of the printing module for printing by the printing head of the output unit 1. Because of the effect of the spring power of the spring member 6, the output unit 1 is maintained in close proximity to the moving sheet member 9, achieving a satisfactory printing performance.

A prototype of printing module for barcode printer has been constructed with the features of FIGS. 1~5. The printing module for barcode printer functions smoothly to provide all of the features, discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A printing module detachably mounted inside a top cover of a barcode printer and adapted to print a barcode on a sheet member, the printing module comprising:
   an output unit adapted to print a barcode on a sheet member, said output unit comprising a relatively higher first mounting face and a relatively lower second mounting face disposed at a top side thereof, and a connector disposed at said second mounting face;
   a bottom panel affixed to said second mounting face of said output unit;
   a locating plate affixed to said first mounting face of said output unit; and
   a holder frame coupled to said locating plate and adapted to secure the printing module to the inside of the top cover of said barcode printer.

2. The printing module as claimed in claim 1, wherein said output unit is a carbon printing head.

3. The printing module as claimed in claim 1, wherein said output unit is an ink printing head.

4. The printing module as claimed in claim 1, wherein said output unit has a plurality of mounting holes disposed at said first mounting face and said second mounting face for the mounting of said locating plate and said holder frame.

5. The printing module as claimed in claim 1, wherein said connector of said output unit is a USB (Universal Serial Bus) connector.

6. The printing module as claimed in claim 1, wherein said bottom panel comprises an elongated base, a retaining portion extended along one long side of said elongated base and smoothly curved in transverse direction and hooked on a bottom side of said output unit, two angled mounting flanges bilaterally extended from an opposite long side of said elongated base and respectively covered on said second mounting face of said output unit at two sides of said connector of said output unit, and at least one mounting hole disposed at each of said angled mounting flanges and respectively fastened to said second mounting face of said output unit by fastening means.

7. The printing module as claimed in claim 6, wherein said bottom panel further comprises an opening defined between said angled mounting flanges for accommodating said connector of said output unit.

8. The printing module as claimed in claim 1, wherein said locating plate comprises an angled side flange hooked on one long side of said output unit over said first mounting face, a plurality of mounting holes respectively connected to said first mounting face of said output unit by fastening means, and a top stub rod for the mounting of a spring member to support a reinforcing plate above said holder frame.

9. The printing module as claimed in claim 8, wherein said locating plate has an opening corresponding to the opening of said bottom panel for accommodating said connector of said output unit.

10. The printing module as claimed in claim 8, wherein said locating plate has coupling means symmetrically disposed at two distal ends thereof for the coupling of said holder frame.

11. The printing module as claimed in claim 1, wherein said holder frame comprises a flat elongated holder base, two extension arms respectively formed integral with two distal ends of said holder base, two first springy hooks respectively outwardly extended from said extension arms and adapted to secure said holder frame to the inside of the top cover of said barcode printer, two second springy hooks respectively inwardly extended from said extension arms and respectively hooked on two distal ends of said locating plate, a top space defined between said extension arms, a plurality of mounting holes formed in said holder base within said top space, a plurality of male locating means upwardly extended from a top surface of said holder base, and a side opening formed in one long side of said holder base on the middle.

12. The printing module as claimed in claim 11, further comprising a reinforcing plate set in the top space between the two II extension arms of said holder frame, said reinforcing plate comprising a plurality of mounting holes respectively connected to the mounting holes of said holder frame by fastening means, a plurality of female locating means respectively coupled to the male locating means of said holder frame, and a bottom stub rod downwardly extended from a bottom wall thereof corresponding to the side opening of said holder frame.

13. The printing module as claimed in claim 12, further comprising spring means suspended in the side opening of said holder frame and connected between the bottom stub rod of said reinforcing plate and a part of said locating plate.

14. The printing module as claimed in claim 13, wherein said spring means is a compression spring.

15. The printing module as claimed in claim 13, wherein said spring means is an elastomer.

16. The printing module as claimed in claim 1, wherein the top cover of said barcode printer comprises a mounting chamber adapted to accommodate the printing module, two hook holes disposed at two sides of said mounting chamber for the positioning of said holder frame, and a signal line having a USB connector for the connection of the connector of said output unit.

* * * * *